UNITED STATES PATENT OFFICE.

JOSEPH F. GENT, OF COLUMBUS, INDIANA, ASSIGNOR TO HIMSELF AND GAFF, GENT & THOMAS, OF SAME PLACE.

ART OF BREWING MALT LIQUORS.

SPECIFICATION forming part of Letters Patent No. 262,761, dated August 15, 1882.

Application filed January 26, 1882. (No specimens.)

*To all whom it may concern:*

Be it known that I, JOSEPH F. GENT, a citizen of the United States, residing at Columbus, in the county of Bartholomew and State of Indiana, have invented certain new and useful Improvements in the Art of Brewing Malt Liquors; and I do hereby declare the following to be a full, clear, and exact description of the invention, such as will enable others skilled in the art to which it appertains to make and use the same.

In the art of brewing malt liquors it has been customary for many years to use a percentage (more or less) of cornmeal in the production of the wort, such cornmeal being ground either from corn having the husk and germ still attached or from corn from which the husk and germ had been previously removed. Both said kinds of cornmeal require to be thoroughly boiled and mashed to accomplish the required reduction, and the comparatively long boiling injures the mash. The subsequent fermentation of the wort obtained from the malt, cornmeal, and hops is also less satisfactory than could be desired. I have discovered that these objections may be overcome and the whole process of brewing vastly improved by using in place of such cornmeal the corn product described in the United States Letters Patent No. 223,847, granted to me on the 27th day of January, 1880.

In order that my invention or discovery may be clearly understood and readily practiced by those skilled in the art of brewing malt liquors, I will proceed to describe the rule which has usually governed heretofore in its practice.

The percentage of this corn product to be used will necessarily vary, according as the brewer desires to make one quality or another of malt liquor. As high as sixty-five per cent., by weight, of it to thirty-five per cent., by weight, of malt may be used. The corn product is mixed with malt, and the mixture is steeped and mashed precisely the same as if malt alone were used. No previous boiling and mashing of this corn product are required, because its proper reduction is as easily and rapidly accomplished as the reduction of the malt. Hops having been added to the mash and steeped with it according to the ordinary method, the wort is drawn off and subsequently treated the same as the wort in brewing as heretofore practiced.

The mode of making and the characteristics of the corn product are fully set forth in my aforementioned Letters Patent, and I deem it unnecessary to describe them in this patent.

In order to distinguish this corn product from other corn products, I will call it here "hulless corn-flakes." I have found in practice that the yield of extract from a given amount of this corn product greatly exceeds the yield of extract from a quantity of cornmeal (whether ground from hulled or unhulled corn) of the same aggregate cost. Besides, previous boiling and mashing are dispensed with. All but about ten per cent. of it is reduced and converted. I have found, furthermore, that the fermentation of the wort containing an admixture of extract from this corn product is much more uniform and perfect as compared with that of wort containing an admixture of extract from cornmeal.

Having thus described my invention, what I claim is—

In the art of brewing malt liquors from barley, malt, and corn, the process of mashing, which consists in steeping a percentage, as set forth, of hulless corn-flakes simultaneously with malt and hops, whereby the preliminary cooking of the corn product is eliminated from the mashing process and the subsequent fermentation improved.

In testimony whereof I affix my signature in presence of two witnesses.

J. F. GENT.

Witnesses:
C. A. NEALE,
C. S. HYER.